(12) United States Patent
Kenworthy (10) Patent No.: US 12,337,541 B2
(45) Date of Patent: Jun. 24, 2025

(54) POWDER BED FUSION ADDITIVE MANUFACTURING SYSTEM WITH DESICCANT POSITIONED WITHIN HOPPER AND ULTRASONIC TRANSDUCER

(71) Applicant: DIVERGENT TECHNOLOGIES, INC., Los Angeles, CA (US)

(72) Inventor: Michael Thomas Kenworthy, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 118 days.

(21) Appl. No.: 16/803,799

(22) Filed: Feb. 27, 2020

(65) Prior Publication Data

US 2021/0268738 A1  Sep. 2, 2021

(51) Int. Cl.
*B33Y 40/10* (2020.01)
*B22F 1/14* (2022.01)
(Continued)

(52) U.S. Cl.
CPC .............. *B29C 64/314* (2017.08); *B22F 1/14* (2022.01); *B22F 12/38* (2021.01); *B22F 12/52* (2021.01);
(Continued)

(58) Field of Classification Search
CPC ....... B29C 64/314; B29C 64/153; B22F 1/14; B22F 12/38; B22F 12/52; B22F 10/00;
(Continued)

(56) References Cited

U.S. PATENT DOCUMENTS 554,230 A  *  2/1896  Berg .................. H02P 9/18
                                                 318/438
3,930,136 A  *  12/1975  Denis ................ B23K 35/0288
                                                 219/137 R
(Continued)

FOREIGN PATENT DOCUMENTS

CN      105318733 A  *  2/2016  ............. B22F 10/28
CN      105890385 A  *  8/2016  ............. B07B 1/40
(Continued)

OTHER PUBLICATIONS

US 9,202,136 B2, 12/2015, Schmidt et al. (withdrawn)
(Continued)

*Primary Examiner* — Xiao S Zhao
*Assistant Examiner* — Guy F Mongelli
(74) *Attorney, Agent, or Firm* — ArentFox Schiff LLP (57) ABSTRACT

Techniques for dehumidifying powder used as print material in a powder bed fusion (PBF) three-dimensional (3-D) system are disclosed. A hopper includes one or more ultrasonic transducers (UTs) positioned at strategic locations. When activated, the UTs use sound pressure at ultrasonic frequencies to agitate the powder particles held in the hopper. The movement of the particles drives moisture trapped between the particles into one or more desiccants. In various embodiments, the desiccants may be supported by desiccators suspended in the powder, such as via the casing of the hopper. In other embodiments, the desiccants may be desiccant bags provided in a desiccant insert. The moisture accumulates in the desiccants. Among other advantages, no separate thermal source is needed to dry the powder, which can be provided directly to the PBF 3-D system via the re-coater for depositing layers to form a build piece.

13 Claims, 5 Drawing Sheets

(51) Int. Cl.
*B22F 10/00* (2021.01)
*B22F 10/10* (2021.01)
*B22F 12/00* (2021.01)
*B22F 12/52* (2021.01)
*B29C 64/153* (2017.01)
*B29C 64/314* (2017.01)
*B33Y 10/00* (2015.01)
*B33Y 30/00* (2015.01)

(52) U.S. Cl.
CPC .............. *B33Y 10/00* (2014.12); *B33Y 30/00* (2014.12); *B33Y 40/10* (2020.01); *B22F 10/00* (2021.01); *B22F 10/10* (2021.01); *B22F 2202/01* (2013.01); *B29C 64/153* (2017.08)

(58) Field of Classification Search
CPC ...... B22F 10/10; B22F 2202/01; B22F 10/28; B22F 2999/00; B22F 10/34; B33Y 10/00; B33Y 30/00; B33Y 40/10; Y02P 10/25
See application file for complete search history.

(56) References Cited

U.S. PATENT DOCUMENTS

| | | | |
|---|---|---|---|
| 4,909,838 A * | 3/1990 | Haddad | B22F 1/16 75/309 |
| 5,172,489 A * | 12/1992 | Moller | F26B 21/083 34/80 |
| 5,203,226 A | 4/1993 | Hongou et al. | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,588,345 B1 * | 7/2003 | Aguirre | B61D 7/00 105/247 |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |

(56) References Cited

U.S. PATENT DOCUMENTS

| | | |
|---|---|---|
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Akic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |

(56) References Cited

U.S. PATENT DOCUMENTS

| | | | |
|---|---|---|---|
| 10,268,181 B1 | 4/2019 | Nevins | |
| 10,269,225 B2 | 4/2019 | Velez | |
| 10,272,860 B2 | 4/2019 | Mohapatra et al. | |
| 10,272,862 B2 | 4/2019 | Whitehead | |
| 10,275,564 B2 | 4/2019 | Ridgeway et al. | |
| 10,279,580 B2 | 5/2019 | Evans et al. | |
| 10,285,219 B2 | 5/2019 | Fetfatsidis et al. | |
| 10,286,452 B2 | 5/2019 | Buller et al. | |
| 10,286,603 B2 | 5/2019 | Buller et al. | |
| 10,286,961 B2 | 5/2019 | Hillebrecht et al. | |
| 10,289,263 B2 | 5/2019 | Troy et al. | |
| 10,289,875 B2 | 5/2019 | Singh et al. | |
| 10,291,193 B2 | 5/2019 | Dandu et al. | |
| 10,294,552 B2 | 5/2019 | Liu et al. | |
| 10,294,982 B2 | 5/2019 | Gabrys et al. | |
| 10,295,989 B1 | 5/2019 | Nevins | |
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 11,103,926 B1* | 8/2021 | Ferrando | B22F 9/04 |
| 2001/0003874 A1* | 6/2001 | Gillette | B29B 13/065 |
| | | | 34/169 |
| 2001/0030383 A1* | 10/2001 | Swanson | B29C 64/106 |
| | | | 242/570 |
| 2001/0045678 A1 | 11/2001 | Kubo et al. | |
| 2002/0185782 A1* | 12/2002 | Koch | B29C 64/135 |
| | | | 425/375 |
| 2005/0029175 A1* | 2/2005 | Farr | B01D 17/0214 |
| | | | 210/143 |
| 2006/0108783 A1 | 5/2006 | Ni et al. | |
| 2007/0299212 A1* | 12/2007 | Smillie | C08L 67/02 |
| | | | 525/425 |
| 2009/0098027 A1* | 4/2009 | Tabata | B01J 19/0093 |
| | | | 422/128 |
| 2010/0055629 A1 | 3/2010 | McKnight et al. | |
| 2010/0237531 A1* | 9/2010 | Lyons | C04B 28/003 |
| | | | 264/132 |
| 2011/0220292 A1* | 9/2011 | Short | B32B 37/00 |
| | | | 156/580.1 |
| 2012/0126454 A1* | 5/2012 | Simmons | C08G 63/916 |
| | | | 525/419 |
| 2013/0289593 A1* | 10/2013 | Hall | G10K 11/004 |
| | | | 264/109 |
| 2014/0277669 A1 | 9/2014 | Nardi et al. | |
| 2015/0096266 A1* | 4/2015 | Divine | G05B 19/4099 |
| | | | 53/558 |
| 2015/0266157 A1* | 9/2015 | Summers | B24B 31/16 |
| | | | 451/113 |
| 2015/0266158 A1* | 9/2015 | Summers | B24B 31/062 |
| | | | 29/564.7 |
| 2015/0321255 A1 | 11/2015 | Colin et al. | |
| 2016/0031159 A1* | 2/2016 | Church | B29C 48/873 |
| | | | 425/375 |
| 2016/0075059 A1* | 3/2016 | Williams | B22F 3/1258 |
| | | | 264/442 |
| 2017/0113344 A1 | 4/2017 | Schönberg | |
| 2017/0252851 A1* | 9/2017 | Fulop | B22F 10/20 |
| 2017/0326623 A1* | 11/2017 | Wowczuk | B22D 25/02 |
| 2017/0334024 A1 | 11/2017 | Buller et al. | |
| 2017/0341309 A1 | 11/2017 | Piepenbrock et al. | |
| 2017/0348771 A1 | 12/2017 | Kawada et al. | |
| 2018/0036964 A1* | 2/2018 | DehghanNiri | B29C 64/393 |
| 2018/0134911 A1* | 5/2018 | Neuman | C09D 129/04 |
| 2018/0169970 A1* | 6/2018 | Harding | B33Y 50/02 |
| 2018/0304367 A1* | 10/2018 | Myerberg | B22F 12/224 |
| 2018/0345411 A1* | 12/2018 | Verheyen | B23K 26/702 |
| 2019/0060998 A1* | 2/2019 | Kelkar | B29C 64/218 |
| 2019/0176404 A1* | 6/2019 | Schoeneborn | B29C 64/314 |
| 2019/0232429 A1* | 8/2019 | Buller | B23K 26/123 |
| 2019/0240724 A1* | 8/2019 | Holcomb | B33Y 80/00 |
| 2019/0299293 A1* | 10/2019 | Lynch | B01D 53/78 |
| 2019/0321917 A1* | 10/2019 | Ku | B23K 26/0876 |
| 2020/0061904 A1* | 2/2020 | Kim | B33Y 30/00 |
| 2020/0147884 A1* | 5/2020 | Flick | B29C 64/329 |
| 2020/0189188 A1* | 6/2020 | Hsu | B29C 64/209 |
| 2021/0178661 A1* | 6/2021 | Peterson | B29C 64/268 |
| 2021/0346963 A1* | 11/2021 | Holcomb | B22F 12/52 |
| 2022/0227021 A1* | 7/2022 | Murakami | C04B 35/16 |
| 2023/0382045 A1* | 11/2023 | Bonilla | B29C 64/205 |

FOREIGN PATENT DOCUMENTS

| | | | | |
|---|---|---|---|---|
| CN | 110715327 A | * | 1/2020 | |
| EP | 3569331 A1 | * | 11/2019 | B22F 3/008 |
| FR | 2279449 A | * | 3/1976 | B01F 11/0258 |
| JP | 2019524504 A | | 9/2019 | |
| KR | 2018041640 A | * | 4/2018 | B22F 3/1055 |
| KR | 20180041640 A | | 4/2018 | |
| NO | 2010142703 A2 | | 12/2010 | |
| WO | 1996036455 A1 | | 11/1996 | |
| WO | 1996036525 A1 | | 11/1996 | |
| WO | 1996038260 A1 | | 12/1996 | |
| WO | 2003024641 A1 | | 3/2003 | |
| WO | 2004108343 A1 | | 12/2004 | |
| WO | 2005093773 A1 | | 10/2005 | |
| WO | 2007003375 A1 | | 1/2007 | |
| WO | 2007110235 A1 | | 10/2007 | |
| WO | 2007110236 A1 | | 10/2007 | |
| WO | 2008019847 A1 | | 2/2008 | |
| WO | 2007128586 A3 | | 6/2008 | |
| WO | 2008068314 A2 | | 6/2008 | |
| WO | 2008086994 A1 | | 7/2008 | |
| WO | 2008087024 A1 | | 7/2008 | |

(56) References Cited

FOREIGN PATENT DOCUMENTS

| WO | 2008107130 | A1 | 9/2008 | |
| --- | --- | --- | --- | --- |
| WO | 2008138503 | A1 | 11/2008 | |
| WO | 2008145396 | A1 | 12/2008 | |
| WO | 2009083609 | A2 | 7/2009 | |
| WO | 2009098285 | A1 | 8/2009 | |
| WO | 2009112520 | A1 | 9/2009 | |
| WO | 2009135938 | A1 | 11/2009 | |
| WO | 2009140977 | A1 | 11/2009 | |
| WO | 2010125057 | A2 | 11/2010 | |
| WO | 2010125058 | A1 | 11/2010 | |
| WO | 2011032533 | A1 | 3/2011 | |
| WO | 2014016437 | A1 | 1/2014 | |
| WO | 2014187720 | A1 | 11/2014 | |
| WO | 2014195340 | A1 | 12/2014 | |
| WO | WO-2015143007 A2 * | | 9/2015 | ............ B08B 7/02 |
| WO | 2015193331 | A1 | 12/2015 | |
| WO | 2016116414 | A1 | 7/2016 | |
| WO | 2017036461 | A1 | 3/2017 | |
| WO | WO-2017205289 A1 * | | 11/2017 | ........... B29C 64/141 |
| WO | WO-2018197876 A1 * | | 11/2018 | ............ B22F 10/28 |
| WO | WO-2018231664 A1 * | | 12/2018 | ............ B07B 1/40 |
| WO | 2019030248 | A1 | 2/2019 | |
| WO | 2019042504 | A1 | 3/2019 | |
| WO | 2019048010 | A1 | 3/2019 | |
| WO | 2019048498 | A1 | 3/2019 | |
| WO | 2019048680 | A1 | 3/2019 | |
| WO | 2019048682 | A1 | 3/2019 | |
| WO | WO-2019079737 A1 * | | 4/2019 | ............ B22D 23/00 |
| WO | WO-2019097255 A1 * | | 5/2019 | ............ B22F 10/00 |
| WO | WO-2019166727 A1 * | | 9/2019 | ............ B22F 10/10 |
| WO | WO-2020002951 A1 * | | 1/2020 | ............ B22F 10/20 |

OTHER PUBLICATIONS

US 9,809,265 B2, 11/2017, Kinjo (withdrawn)
US 10,449,880 B2, 10/2019, Mizobata et al. (withdrawn)
CN-110715327-A trasnlation (Year: 2023).*
FR-2279449-A translation (Year: 2023).*
Sextro NPL (https://www.researchgate.net/publication/324423307_Vibration-Assisted_Handling_of_Dry_Fine_Powders) (Year: 2018).*
JP 2002/347030 (Year: 2002).*
JP 3668864 (Year: 2005).*
CN 106315647 (Year: 2017).*
WO-2019151380-A1 (Year: 2019).*
CA-3137888-A1 (Year: 2020).*
WO-2021007425-A1 (Year: 2021).*
KR 20180041640 NPL (Year: 2018).*
WO_2019166727_A1 (Year: 2019).*
WO-2018231664-A1 (Year: 2018).*
International Search Report received for corresponding International Application No. PCT/US21/19403 dated May 6, 2021.
Extended European Search Report in EP21760332.3, mailed Feb. 5, 2024, 8 pages.

* cited by examiner

POWDER BED FUSION ADDITIVE MANUFACTURING SYSTEM WITH DESICCANT POSITIONED WITHIN HOPPER AND ULTRASONIC TRANSDUCER

BACKGROUND

Field

The present disclosure relates generally to powder-bed fusion (PBF) systems, and more particularly, to removing moisture from powder-based print material in PBF three-dimensional (3-D) systems.

Background

PBF 3-D systems can produce structures, referred to as build pieces, with geometrically complex shapes, including some shapes that are difficult or impossible to create with conventional manufacturing processes. PBF 3-D systems create build pieces layer by layer. A 3-D software representation of the structure is initially provided. The 3-D representation is converted into layers that each correspond to a cross section of the structure. Each layer or "slice" is then formed in succession by depositing a layer of print material in powder form and exposing portions of the layer to an energy beam. The energy beam selectively melts areas of the powder layer that coincide with the cross section of the build piece in the layer. The melted powder fuses together to form a solid portion of the structure.

SUMMARY

Several aspects of apparatuses and methods for dehumidification in PBF additive manufacturing (3-D printing) systems are disclosed.

In one aspect of the disclosure, a PBF system includes a powder bed receptacle, a hopper to store powder, the hopper comprising an ultrasonic transducer configured to dehumidify the powder by driving moisture to a desiccant positioned in the hopper, and a re-coater to deposit layers of the dehumidified powder onto the powder bed.

In another aspect of the disclosure, a hopper for holding powder in a PBF 3-D printer includes a casing for holding the powder, an insert in the casing for positioning a desiccant, at least one ultrasonic transducer coupled to the casing for ultrasonically agitating the powder and driving moisture into the desiccant to thereby produce dehumidified powder; and an aperture in the casing for providing the dehumidified powder to a re-coater.

In still another aspect of the disclosure, a method for dehumidifying powder in a PBF 3-D system including a hopper having at least one ultrasonic transducer, includes receiving powder in the hopper, and de-humidifying the received powder using the at least one ultrasonic transducer, including mechanically agitating the powder at one or more ultrasonic frequencies to drive moisture into a desiccant.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The terms "example" and "exemplary" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

In PBF systems, it is important to use dry print material so that unwanted agglomeration of print material due to moisture can be reduced and flowability of powders can be increased. Heating can be used for dehumidification or drying processes performed away from the printer, but there is little or no assurance that the powder will be sufficiently devoid of moisture prior to being deposited into the print system.

This disclosure describes an integrated ultrasonic system in a PBF 3-D system to dehumidify powders used as print material. In an embodiment, a plurality of ultrasonic transducers (UTs) are distributed across a hopper in which the powder is stored prior to use in a print job, with the ultrasound-emitting portion of the transducers extending through an inner surface of the hopper casing. The UTs can be used to drive moisture trapped in the powder particles into one or more desiccants positioned in the hopper. In various embodiments, one or more UTs can be integrated inside the casing of the hopper. Alternatively, UTs can be distributed across strategically-positioned receptacles in a casing of the hopper such that the transducer that produces the ultrasound is in contact with the powder. The desiccants that receive the moisture can be desiccant bags positioned in respective inserts of the hopper and operable to receive the moisture. Alternatively, each of the one or more desiccants may be maintained in a desiccator. The desiccator(s) may be suspended in an upper surface of the hopper to extend into the powder and may receive the moisture as it is driven upward by the UTs.

Metallic powder particles are generally small, hygroscopic and have a high surface-area to volume ratio. Thus, the powder particles are prone to trap moisture in areas between them. The moisture tends to remain. The integrated ultrasonic agitation system as disclosed herein causes the particles of powder to mechanically vibrate against each other, thereby liberating much of the moisture that otherwise tends to compromise print quality.

Among numerous other benefits, the disclosed ultrasonic dehumidification system can enhance flowability of the powder by ensuring a more effective overall dehumidification (as opposed to, for example thermal dehumidification). In particular, the UTs can prevent the accumulation of powder particles in the hopper into clusters due to trapped moisture that would otherwise inhibit the flowability of the powder that is critical to create accurate print jobs. Use of the UTs thereby removes moisture-saturated powder clumps and in so doing, enhances overall flowability of the powder.

Positioning the dehumidifier components in the hopper is particularly advantageous in that the newly dried powder is thereafter provided directly to other portions of the PBF 3-D system (e.g., the re-coater) for deposition into the powder bed. The direct nature of the powder dehumidification means that no intervening action or process can generally contaminate the dried powder by reintroducing moisture into the powder as it is routed from the hopper and into the powder bed via the re-coater for use in a print job. At that point, the freshly dehumidified powder may be selectively exposed to an energy beam source during a series of ensuing print cycles for successfully rendering a build piece in a print job.

In addition, use of the disclosed techniques avoids the need to have a powerful thermal source such as induction coils integrated with, or adjacent, the PBF 3-D system, that could otherwise damage the PBF 3-D system or scorch the powder particles by exposing them to undesirable temperatures. While the present disclose does not preclude use of thermal sources in conjunction with the described ultrasonic techniques, it renders unnecessary the use of powder-dehumidification techniques using ultra-high temperatures (in some cases 1000K or greater) proximate the sensitive print equipment.

The disclosed ultrasonic dehumidification systems can both be used as a complementary system, or a wholesale replacement system, to a separate thermal-based dehumidification source. In addition, the systems described herein can provide financial advantages to the user. That is, by increasing the effectiveness of dehumidification, the flowability of powders with a larger size distribution can also be improved, potentially obviating the need for utilizing a finer, more expensive powder.

Additive Manufacturing. Additive Manufacturing ("AM"), also known as 3-D printing is a process of making 3-D solid objects from digital files. AM initially involves the use of a stored 3-D geometrical model for accumulating layered materials on a build plate to produce a 3-D build piece having features defined by the model. AM techniques are capable of printing structures of arbitrary geometrical complexity using a wide variety of materials.

The print cycle conventionally begins with a designer that renders a 3-D computer-aided design (CAD) file of the object to be printed, sometimes called the "build piece". This phase often involves a rigorous 3-D software design of the component that may be specialized for subsequent use in a vehicle, aircraft, or other transport structure, or otherwise as a stand-alone component after being 3-D printed. Initially, during the CAD stage, the component is created as a 3-D software design representation such that the details and features of the model are available to a viewer at a computer in three dimensions.

The CAD stage is conventionally followed by a computer-aided manufacturing (CAM) stage. This stage often includes support structure generation. The support structures may, for example, be needed to support certain structural features of the build piece and to prevent sagging or deformation, such as curved or inclined features.

Following the CAM stage, another software application may operate to "slice" the 3-D CAD representation of the build piece into a collection of individual layers. Each of the slices begin as software-based representations that correspond to a single layer of the overall build piece. Print commands may be compiled using these slices along with the CAD file and other information and provided to the PBF 3-D system, where the actual rendering of the build piece can begin.

Powder bed fusion. PBF is an additive manufacturing technology that creates a build piece one layer at a time using a fine powder as the print medium. Various metallic or alloy-based powders may be candidates for print powder. Generally, finer powders are more expensive, but coarser powders can work also work well, especially if all the humidity has been removed. This increases their flowability. Coarser powders can also be used on regions of the build piece that may not require the precise geometrical accuracy of other regions.

The powder is sintered or melted with an energy beam source such as, for example, a laser or an electron beam. PBF 3-D systems ordinarily rely on a controller, which may be an single or distributed processing system including one or more processors and memory circuits that execute appropriate print instructions to deposit powder layers using a re-coater, and to selectively fuse the deposited powder in a layer-by-layer fashion in the printer as prescribed by the sliced CAD model.

After each layer is deposited in a deposition cycle, designated portions of the powder are exposed to an energy beam source that uses a deflector to focus its energy beam in a desired direction. In a subsequent print cycle, the energy beam source selectively melts areas of the powder layer that coincide with the cross-section of the build piece in the layer. The melted powder cools and fuses to form a slice of the build piece. A next deposition cycle occurs, and the process can be repeated to form the next slice of the build piece, and the next, and so on until the build piece is complete. The resulting structure is a build piece assembled slice-by-slice from the ground up.

To successfully achieve a high-resolution build piece with detailed features that correspond to the CAD model, the temperatures generally need to be carefully controlled. The random presence of trapped moisture in the particles can potentially have a dramatic and adverse effect on the temperature of the weld pool of melted particles created by application the energy beam. Also, where the deposited powder particles include trapped moisture, the powder density at the point of welding can be adversely affected. These phenomena may result in unwanted artifacts in the completed build piece, or deformation. Accordingly, maintaining the powder in a dry state is a desirable criterion for achieving good quality control in PBF 3-D systems.

Figure 1:
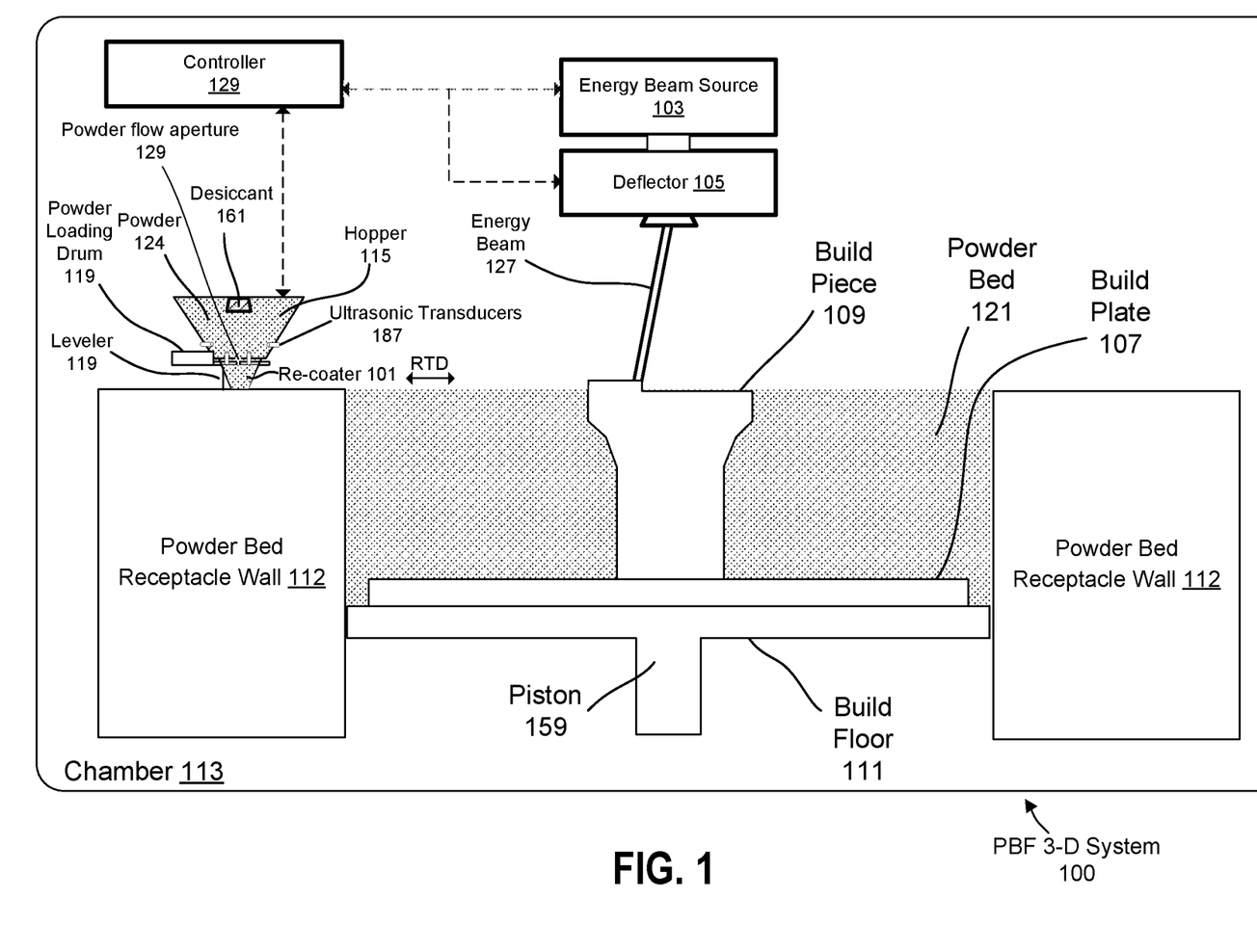
FIG. 1 is a block diagram of an exemplary PBF 3-D system using a hopper including ultrasonic transducers and a desiccant for dehumidifying powder to be used as print material, with reference to an embodiment.

FIG. 1 is a block diagram of an exemplary PBF 3-D system 100 using a hopper 115 including ultrasonic transducers 187 and a desiccant 161 for dehumidifying powder 124 to be used as print material, with reference to an embodiment. PBF 3-D system 100 includes chamber 113, within which the print job may occur. The chamber 113 may provide a closed environment filled with an inert gas (such as Argon, for example) to ensure that the powder 124 does not appreciably react with elements in its atmosphere during the print job in a manner that could deleteriously change the chemical nature of the print material. Using an inert gas minimizes the chances of a reaction (e.g., oxidation caused by the presence of oxygen).

PBF 3-D system 100 includes a build floor 111 to enable placement of a substrate such as build plate 107 thereupon. PBF 3-D system 100 further includes surrounding powder bed receptacle walls 112 that bound a powder bed receptacle for enclosing powder bed 121. For ease of viewing the internal portion of PBF 3-D system 100, powder bed receptacle walls 112 are omitted from the front of the illustration. In various embodiments, the chamber 113 or the powder bed receptacle walls 112 may include one or more windows to enable a technician to view the progression of the print job.

PBF 3-D system 100 includes controller 129, which may include one or more processors such as microprocessors, digital signal processors (DSP), and various other analog and digital circuits configured to receive signals and transmit instructions to the different regions of the PBF 3-D system 100 and the actuators and control inputs included in a given region. Controller 129 may be partially or fully integrated within PBF 3-D system 100, or it may be part of a dedicated or generic computing device coupled to PBF 3-D system 100. The specific configuration of controller 129 and criteria including where applications are run may depend on factors like the model of the PBF 3-D system 100 (or components therein) and/or the manufacturer's preferences. Controller 129 may also include, in addition to a centralized or distributed processing system, one or more processors, different kinds of memory (volatile, non-volatile, read only memory, random access only (RAM), programmable read only memory, erasable-programmable read only memory, static RAM, dynamic RAM, etc.) to store data files, programs, dynamic link libraries, configuration parameters, and the like. Controller 129 may include more than one processing element distributed in different locations of the PBF 3-D system 100 for performing specific functions. In an embodiment, some or all of the different processing elements (omitted for clarity) in this embodiment of controller 129 are connected together so that instructions and operations can be coordinated in a manner that maximizes efficiency. In another embodiment, the controller 129 is networked to one or more external servers or workstations to enable the PBF 3-D system 100 to automatically receive external instructions from CAD or CAM applications, or slicing applications, for performing print jobs. In still other embodiments, a user of a computing device networked or directly connected to controller 129 or PBF 3-D system 100 (or software on the computing device) may be authorized to control the PBF 3-D system 100 during a print job. The computing device may also be configured to control the order and priority of print jobs, etc.

PBF 3-D system 100 further includes hopper 115. In the context of AM, a hopper is broadly defined as a structure for storing print material. The hopper 115 may be a tank, silo, a cylinder, or any other geometrical structure suitable for storing powder. As illustrated further below with respect to FIGS. 2 and 3, the long side of the hopper 115 in FIG. 1 is pointed into the page, and only an edge portion of hopper 115 is visible. While hopper 115 in this embodiment is integrated into the PBF 3-D system 100, it will be appreciated that the hopper 115 in other embodiments may be adjacent the PBF 3-D system 100. In addition, in various embodiments, hopper 115 may be one of a plurality of hoppers connected to PBF 3-D system 100. The hoppers in this latter system may be incorporated in series or in parallel and used to maximize printing volume, for example. Controller 129 or a user of the PBF 3-D system 100 (or an automated control unit for PBF 3-D system 100) may control the current hopper that will be in use at any given time. Different hoppers may include different powders.

While hopper 115 is positioned above a re-coater 101 into which it disperses powder 124 as necessary, in other embodiments, hopper 115 (or a network thereof) may use a different mechanism to provide the powder 124 to the PBF 3-D system 100. For instance, where more than one hopper is used, each hopper may be connected to PBF 3-D system 100 by a pressurized hose, or the hoppers may be coupled to a manifold including different selectable channels, for example. Further, while hopper 115 has a distinct inverted semi-triangular appearance, other hoppers in various embodiments may have different shapes, such as a cylindrical shape, a silo shape, a cubic shape, or any random or arbitrary shape that is well-suited to store large amounts of print material. It will be appreciated that the shape, number, and delivery method of hoppers, and the method of integration of the hopper(s) with PBF 3-D system 100, represent design details that do not depart from the spirit or scope of the present disclosure.

In this exemplary PBF 3-D system 100, hopper 115 may be fixed to a side of chamber 113 above a powder bed receptacle wall 112, or it may be secured to PBF 3-D system 100 in another manner. The function of hopper 115 is to store the majority of powder to be used in a single rendering of a build piece 109 or plurality thereof.

In an aspect of the present disclosure, in addition to storing powder 124 in volume, hopper 115 also dehumidifies the powder 124. In the example shown, hopper 115 includes an insert at its top where a desiccant 161 is positioned. The desiccant 161 may be a desiccant bag that can be positioned within the insert and replaced as necessary, e.g., just before it becomes saturated with moisture. The desiccant 161 may alternatively be a replaceable cartridge filled with activated charcoal, calcium sulfate, calcium chloride, molecular sieves or some other commonly used desiccant 161, provided only that the elements used are compatible with, and do not contaminate, the powder 124. The desiccant 161 may be a desiccator for holding a desiccant material. While obscured from view, the insert in which desiccant 161 is positioned includes an aperture or slit running longitudinally across the upper portion of hopper 115. This aperture enables desiccant 161 to make direct contact with the powder 124 when the hopper 115 is filled. In other embodiments, a plurality of desiccants may be used on a single hopper 115 (or in multiple hoppers). The use of more than one desiccant 161 may be especially useful when the level of powder 124 in hopper 115 is lowering. To account for this event, hopper 115 may include desiccants arranged in inserts or cavities lower down on hopper 115. In other embodiments, powder 124 is first filled to a maximum amount in hopper 115, at which point the dehumidification process can be initiated for the entire powder supply to effect a single dehumidification procedure prior to initiating a print job. This embodiment may reduce the number or size of desiccants necessary for operation. The use of desiccant 161 at or near a surface of the hopper 115 is advantageous in that the desiccant 161 is easily accessible, and therefore easily replaceable as necessary. Nonetheless, alternative embodiments may allow for placement of desiccant 161 in a defined position within the cavity of the hopper 115. Still other embodiments may need only require one or more desiccant bags to be placed in hopper 115 prior to dehumidification, without a specific structure or insert for accommodating the desiccant bag.

Figure 2:
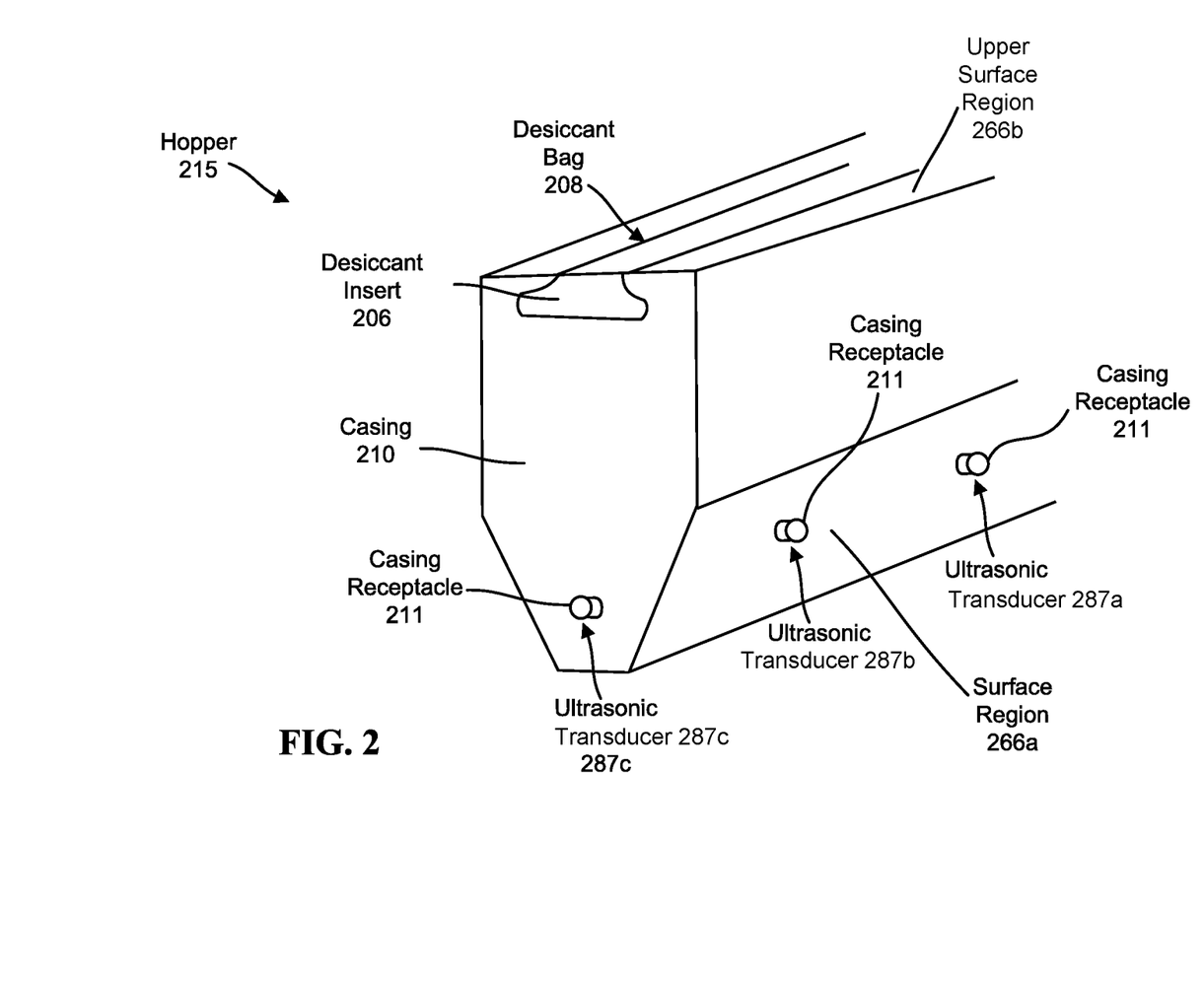
FIG. 2 is a perspective view of a hopper including a desiccant bag positioned in a desiccant insert and a plurality of ultrasonic transducers connected in receptacles within the casing, with reference to an embodiment.
Figure 3:
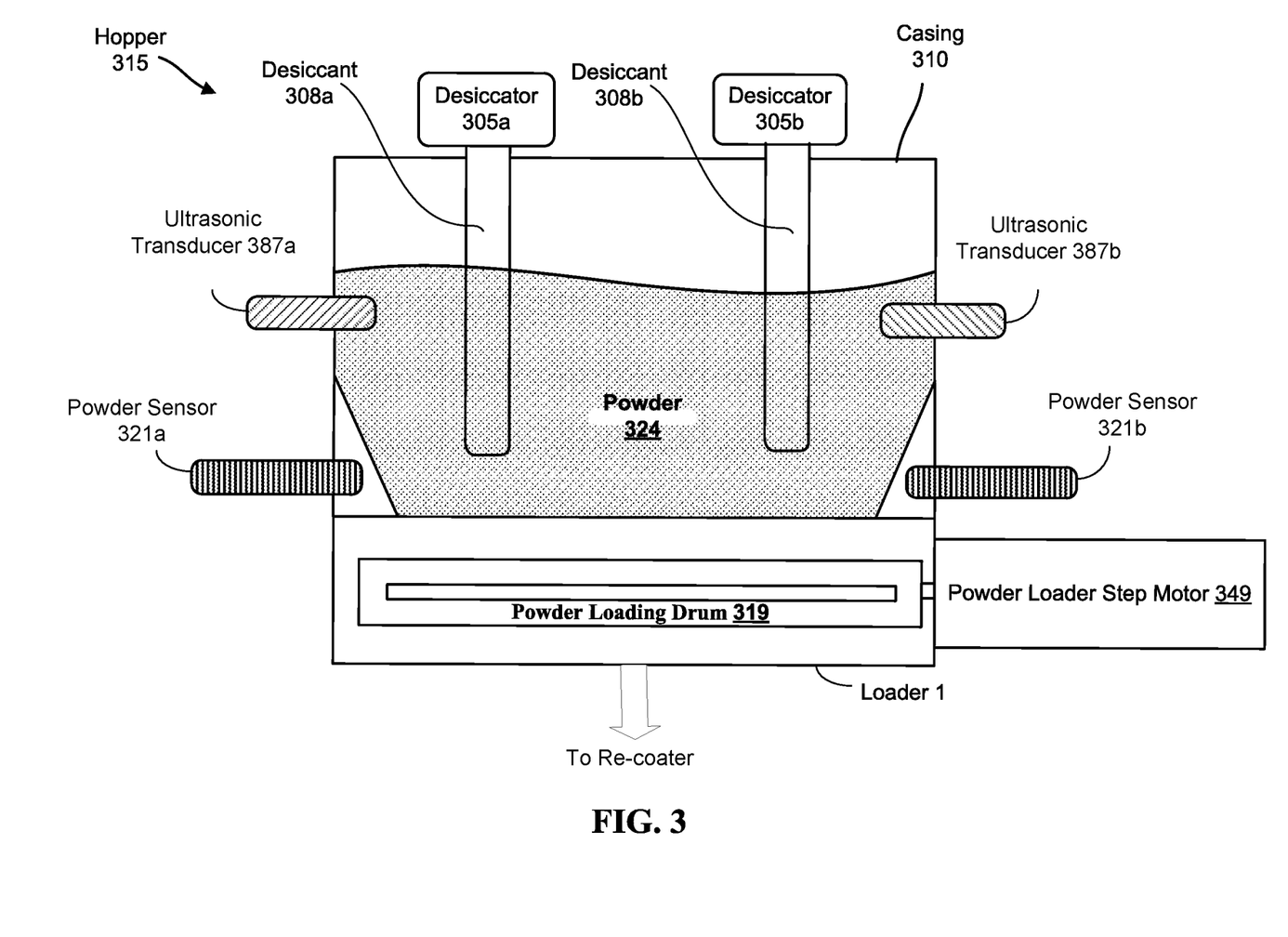
FIG. 3 is a block diagram of a hopper including desiccators suspended within the hopper for holding desiccants to receive moisture from the powder when the ultrasonic transducers are activated, with reference to another embodiment.

Hopper 115 further encloses a plurality of UTs 187 embedded in the hopper casing at a lower portion of hopper 115. In this embodiment, two UTs 187 are shown running parallel to the powder bed 121, and two UTs 187 are shown running perpendicular to the powder bed 121. One or more UTs 187 may be used, depending on the power of the UTC 187, the available power supply, the size and capacity of hopper 115, and other factors. While the UTs 187 are positioned in two directions in the embodiment shown, various embodiments may use UTs 187 in different portions of the casing of the hopper (FIGS. 2, 3). The shape of the hopper in a given embodiment may militate the positioning of the UTs 187. While the UTs 187 may be configured to directly oppose a desiccant in alternative embodiments, this is not required. All that is required is that, taking into account the shape and capacity of the hopper in use, the curvature (if any) of the casing, and the tendencies of the ultrasonic waves to reflect in a general direction toward a desiccant, that the moisture ultimately reach a desiccant. For this reason, a large number of configurations are possible. Further, while the UTs 187 are shown in FIG. 1 as embedded within the hopper casing such that the transducer/speaker portion is in contact with powder 124, in other embodiments the UTs 187 may reside inside the hopper cavity, rather than being fixed in the casing as shown. In addition, one or more power sources may be made available to the UTs 187 by a network of wires or metallic traces, which may also be embedded within the hopper 115. The power source and connections are omitted for clarity.

Coupled to hopper 115 on the left is a powder loading drum 119. Along with a step motor (FIG. 3), the powder loading drum 119 may be used to load additional powder 119 into the hopper 115.

Directly underneath hopper 115 is a re-coater 101. The re-coater 101 may alternatively be referred to as a depositor, a roller, etc. Re-coater 101 is coupled to a leveler 119. In an embodiment, re-coater 101 obtains powder from the hopper 115 via a controller-enabled powder flow aperture 129 disposed in the center of the hopper 115 and re-coater 101 where the where the two structures meet. The vertically-oriented, dashed bi-directional arrow from controller 129 to hopper 115 indicates that in this embodiment, the controller 129 can control the opening and closing of aperture 129 along with other functions of hopper 115 and re-coater 101. Sufficient powder 124 for building each layer can be supplied by dropping a controlled volume of powder 124 from the hopper to the re-coater 101. Only a side edge of re-coater 101 is visible in FIG. 1. The re-coater 101, however, is wide enough to extend into the illustration to deposit layers of powder 124 across the entire width of the powder bed 121.

Having been filled with dehumidified powder 124 from hopper 115, and per instructions from controller 129, the re-coater 101 initiates a deposition cycle. In this cycle, the re-coater 101 and leveler 119 begin to sweep across the powder bed in the direction labeled by the arrow "RTD" ("re-coater travel direction"). The initial sweep to deposit the first layer on the build plate 107 is from left to right. The re-coater 110 typically includes one or more slits (obscured from view) on its posterior surface that pour out the powder 124 in generally even amounts as the re-coater 101 is propelled across the surface of the powder bed 121. The leveler 119 finely spreads the dispersed powder 124 to just the right depth to form a layer that coincides with the modeled slice. In alternative embodiments, the depositing slits are directly adjacent the leveler 119, which may be a structure permanently attached to the hopper 115.

As the re-coater 101 moves across the powder bed 121, controlled amounts of powder 124 intended to correspond to a single thin layer are uniformly deposited over the build plate 107 and evenly spread across the powder bed by leveler 119. In other embodiments, the powder 124 is deposited and/or spread by a counter-rotating roller, wiper or doctor blade.

The re-coater 101 in this PBF 3-D system 100 is a bidirectional structure that is configured to move along with the leveler 119 from one end of the powder bed 121 to the other end for depositing and spreading a layer of powder 124 during a deposition cycle. After the re-coater 101 reaches the right side in this example, it moves over the right powder bed receptacle wall 112 and becomes stationary while a print cycle occurs. In various embodiments, the re-coater 101 moves along a track or frame in the PBF 3-D 100 system, which track or frame may be aligned precisely in parallel with the powder bed 107. In other embodiments, the re-coater 101 is moved using a robotic arm (not shown).

After a print cycle occurs on the freshly deposited layer (see below), the re-coater 101 may begin moving to the left to initiate a new deposition cycle on the powder bed 121. As before, the re-coater 101 carefully deposits another layer of powder 124 over the powder bed 121, and the leveler 119 spreads the deposited powder evenly, to form another layer as the re-coater 101 finally returns to its position under the hopper 115. A second print cycle may then commence on the freshly deposited second layer.

After a number of deposition and print cycles have passed, the powder 124 begins to accumulate in the powder bed 121. In order to maintain each layer at a fixed distance from the print circuits (below) including the deflector 105 and energy beam source 103, the base of PBF 3-D system 100 may be configured with a piston 159. Starting at the beginning of the print job, the piston 159 causes the build floor 111 (and hence the build plate 107 and the powder bed 121) to move vertically downward in an amount equal to the thickness of a layer each time the re-coater 101 conducts a powder drop in a deposition cycle. This way, as noted above, the build piece 109 is allowed to grow larger in size while staying the same distance from the energy beam source 103 and reflector 105. That way, once the distance between the energy beam source and reflector 105 is optimized at the beginning of the print job, it can remain at that same optimized distance as the build piece 109 and powder bed 121 grow under the increasing number of powder drops.

Each time the re-coater 101 is positioned back under the hopper 115 and another print cycle is initiated, the re-coater 101 may use a circuit or mechanical measuring device to determine how much powder 124 remains in its cavity. This information may be conveyed to controller 129. If the amount of powder 124 is insufficient to accommodate two deposition cycles, then the controller 129 can cause the powder flow aperture to reopen, allowing the hopper to refill the re-coater with dehumidified powder 124. Otherwise, if the re-coater has enough powder 124, this step can be skipped. In either case, after the latest print cycle has been completed, the controller 129 may continue to instruct the re-coater 101 to conduct another deposition cycle until a point is reached when the re-coater 101 needs a powder refill. The sequence of a deposition cycle followed by a print cycle may continue until all layers are deposited and the build piece 109 is complete.

In an alternative embodiment, the hopper 115 is part and parcel of the re-coater 101 and moves in lock step with the re-coater 111 during deposition cycles. Also, in some embodiments, the leveler 119 may include more one or more precision blades. The blade may be a hard blade, a soft blade, or somewhere in between. The blade may be metallic, plastic, or hard rubber, and may have different shapes that optimally facilitate its intended purpose in light of factors like the density, weight or type of powder 124. In other embodiments, the leveler 119 may be a rolling member.

For example, the leveler 119 may take the form of a cylindrical shaped roller that is positioned horizontally across the powder bed 121 and that smooths out the deposited powder by gently rolling it straight. In these cases, the roller may smooth out a powder ejected from a re-coater 101, or roller itself may store and eject the unfused powder. Still other embodiments may be adopted using different powder ejection mechanisms that remain within the scope of the disclosure.

Referring back to controller 129, the controller 129 may be responsible for initiating print cycles as well as powder deposition cycles. The horizontal bi-directional arrows from the controller 129 to and from energy beam source 103 and deflector 105 is intended to conceptually represent the controller 129 issuing commands to, and receiving feedback from, these devices.

In particular, after a layer is deposited per the above-described procedures, the controller 129 may initiate a print cycle consistent with data compiled for the layer just deposited. Responsive to controller instructions, the deflector 105 may alter its position relative to a coordinate system (e.g., x, y, z). The energy beam source 103 uses deflector 105 to send an energy beam that, by preferably altering the angle of the deflector 105 (and hence the direction of energy beam 127), selectively fuses the identified regions of the deposited powder 124. The initial fusing may cause a weld pool of melted powder due to thermal gradients from energy beam 127 before the identified area solidifies. The energy beam source 103 continues to use the deflector 105 to alter the trajectory of the energy beam 127 until all details of the present layer are printed. The energy beam source 103 may then be disabled and another deposition cycle can take place. The entire process may continue until the build piece 109 is complete.

For purposes of illustration, one energy beam source 103 and one deflector 105 is shown. In other configurations, PBF 3-D system 100 may include a plurality of energy beam sources 103 and deflectors 105 distributed across chamber 113 for generating one or more respective energy beams 127. For example, PBF 3-D system 100 may be housed in a closed chamber 113 with a ceiling in which one or more energy beam sources 103 are arranged sequentially or in a pattern.

During a print cycle, the controller 129 may specifically direct the deflector 105 to fuse identified areas, where the powder melts and solidifies. Portions of the layer that are not fused remain in powder form and do not become part of the build piece 109.

Operation of a PBF 3-D system with a number of specific features is being demonstrated. However, an appreciable number of PBF 3-D systems are either commercially available or in development that have different features. It should be understood that the specific features of a PBF 3-D system may differ, and the details above are discussed for purposes of context and illustration. Accordingly, it will be appreciated by those skilled in the art upon perusal of this disclosure that the PBF 3-D system, the hopper 115 or the re-coater 101 may include additional or different features and geometries while remaining within the scope of the present disclosure.

FIG. 2 is a perspective view of a hopper 215 including a desiccant bag 208 positioned in a desiccant insert 206 and a plurality of ultrasonic transducers (UTs) 287a-c connected within casing receptacles 211, with reference to an embodiment. The geometry of hopper 215 in FIG. 2 is similar to that of FIG. 1, except that the lower portion of the hopper 215 has additional surface regions 266a. The hopper 215 is essentially a powder storage tank that includes a casing 210 for holding the powder. An upper surface region 266b includes desiccant insert 206 for enabling a desiccant bag 208 to be positioned therein. The desiccant insert 206 may include a region to enable seating of the bag along with an aperture, slit a fine mesh, or another suitable geometry that allows the desiccant bag 208 to contact the powder when the hopper is filled.

The hopper 215 further includes a plurality of casing receptacles 211 into which respective UTs 287a-c have been inserted. The UTs 287a-c may be custom manufactured. Alternatively, the UTs 287a-c may be commercial off the shelf (COTS) parts, and the casing receptacles 211 are formed to receive the COTS UTs 287a-c. In some embodiments, the UTs 287a-c may be similar in geometry (but not in function) to a vehicle spark plug, and may be inserted into the respective casing receptacle 211 via threads, adhesive, or the like. In other embodiments, the UTs 287a-c may be fitted into the casing receptacles 211 using mechanical fasteners. A power source (not shown) may be routed internally inside the casing such that each of the UTs 287a-c may receive the necessary power to run. In an embodiment, UTs 287a-c also include an input for activating and deactivating them. A wire or metal trace may be routed from controller 129 to each of the UTs 287a to perform the activation/deactivation.

It should be noted that, since only a relevant portion of hopper 215 is shown in FIG. 2, hopper 215 may include additional UTs 287a-c across different surface regions not visible in the drawings.

In operation, hopper 215 may be filled with powder via a loading drum (FIGS. 1, 3) or an opening in the upper surface region 266b. The controller 129 may thereupon activate the UTs 287a-c (and others, if available), either concurrently or in a random or controlled sequence. The UTs 287a-c mechanically agitate the powder to remove trapped moisture that has gathered within the powder. Removal of moisture reduces or removes clumps in the powder and enhances flowability. The use of ultrasound instead of a powerful thermal source protects the integrity of potentially delicate structures in the 3-D PBF system 100.

Since the desiccant bag is positioned on upper surface region 266b and the UTs 287a-c are generally arranged in a surface region that is much lower, it is expected that the ultrasound waves will propagate through the powder. In some cases, the ultrasound waves will be reflected upward. This activity will continue in order to ensure that virtually all the powder is moved and that the trapped moisture will travel upwards until it reaches the desiccant bag 208. In various embodiments, the UTs 287a-c may be positioned in alternative orientations to ensure that the moisture is propelled upward into the desiccant bag 208. In other orientations, a plurality of desiccant bags may be positioned in different locations to ensure that most or all of the moisture is collected from the powder during dehumidification.

As noted above, in various embodiments, the UTs 287a-c may be embedded within the hopper 218, e.g., at a bottom surface region (obscured from view) to drive the powder upward. In other embodiments, partial internal trays or baffles (obscured from view) may be positioned within hopper 218 to capture upcoming particle clumps and/or moisture droplets so that these items are drawn closer to the desiccants despite opposing gravitational forces or other interfering factors.

FIG. 3 is a block diagram of a hopper 315 including desiccators 305a-b suspended within the hopper via the casing on the upper portion for holding desiccants 308a-b within at least a portion of the powder 324. The desiccants 308a-b may be composed of any materials suitable for ensnaring water droplets from their surroundings, and in more sophisticated configurations, they may be electro-mechanical in nature. Alternatively, typical molecular substances may be used such as those described above. The desiccants 308a receive moisture driven through the powder when the UTs 387a-b are activated. As in FIG. 2, the UTs 387a-b emit are embedded within the casing 310 of hopper 315 and emit ultrasonic impulses (e.g., discrete or continuous) that remove the trapped moisture. While two UTs 387a-b are shown, one or more such devices may be used to accommodate the size of a particular hopper (e.g., hopper 315).

FIG. 3 also shows powder sensors 321a-b embedded in the casing 310 at the lower part of the hopper 315. The powder sensors 321a-b are electronic devices that may be coupled to controller 129, for example, or they may include digital inputs and outputs that are networked to a workstation or other computing device. Powder sensors 321a-b may function to keep the PBF 3-D system 100 or users thereof apprised of the fill status of hopper 315. When the powder 324 reaches a threshold such that it can no longer deposit enough powder 324 to complete the next deposition cycle(s), or in some cases well before this point, hopper 315 can be refilled and then dehumidified. FIG. 3 shows powder loading drum 319 coupled to powder loader step motor 349. Powder loading drum 319 can be used to automatedly load powder from the drum into the hopper 315.

In various embodiments, the powder loading drum 319 can be disengaged and used along with powder loader step motor 349 to load another hopper after loading of hopper 315 is complete. As in embodiments described above, certain sophisticated configurations enable a plurality of hoppers to be used in series, such that after the powder of a given hopper is depleted, another one is available to take its place. Each of these hoppers can be equipped with individual UTs and desiccants for enabling dehumidification immediately prior to use. A given hopper 315 may receive a refill from a drum or other device, as discussed above. In a multi-hopper system, each hopper used in the PBF 3-D system 100 must be equipped to provide powder to the re-coater 101, After dehumidification, hoses, pipes or manifolds to transfer the powder 324 from a given hopper 315 to the re-coater 101 in multi-hopper embodiments may be used. The ultrasonic dehumidification can be run in parallel on a number of hoppers, or alternatively, only the hoppers of a multi-hopper system that are earmarked for use in a series of print jobs may be dehumidified.

Figure 4:
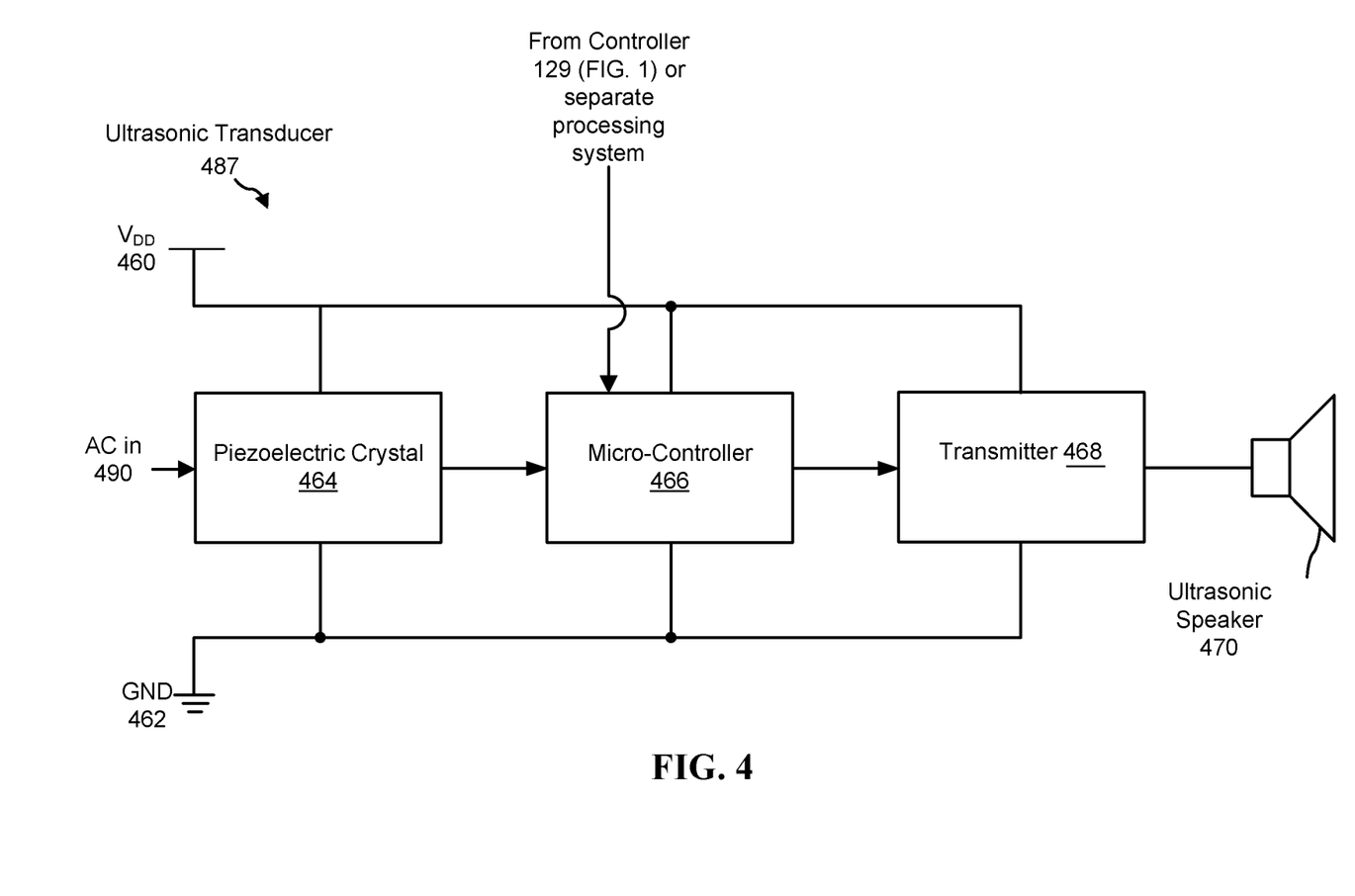
FIG. 4 is an exemplary block diagram of an ultrasonic transducer.

FIG. 4 is an exemplary block diagram of an ultrasonic transducer 487. An ultrasonic transducer is a device that generates waves in the ultrasonic range. The ultrasonic range includes frequencies above about 18,000-20,000 hertz (Hz), which is generally above the capability of human hearing. Ultrasonic transducers 487 function by converting electrical energy into sound and by transmitting the resulting sound waves. Piezoelectric crystals, such as piezoelectric crystal 464, are commonly used for this conversion process. Piezoelectric crystals oscillate by changing size and shape at high frequencies upon application of an alternating current (AC) electric potential. The applied AC potential creates a high frequency sound at a pressure controlled by the input signal. The amount of oscillation is similar or identical to the frequency of the input signal.

UT 487 may receive an input power source $V_{DD}$ (460) and GND (462) for the interfaces in the piezoelectric crystal 464, micro-controller 466 and transmitter 468. The micro-controller 466 may receive an activation signal from controller 129, which signal also may be simultaneously transmitted to other UTs in the hopper. The micro-controller 466 or controller 129 may cause an AC input voltage to be received at the AC in 490, which causes oscillation of the piezoelectric crystal 464 and in turn creates mechanical motion at the piezoelectric crystal 494. The micro-controller 466 may provide the piezoelectric crystal output to a transmitter 468, the latter of which may be tuned to drive the piezoelectric crystal 464 output up to higher intensities. The enhanced output may thereupon be provided to an ultrasonic speaker. The transmitter 468 and/or the ultrasonic speaker 470 may include diaphragms and resonators for transmitting the output ultrasonic wave, which in turn emits ultrasound impulses into the powder supply. These impulses, which may be ultrasonic waves, energy, impulses, agitation, etc., cause the powder particles to vibrate and release trapped moisture as described herein. The continued ultrasonic impulses cause the moisture to travel away from the UT 487, and ultimately into an appropriately-positioned desiccant where it can be trapped and later removed from the hopper.

It should be noted that in some embodiments, UT 487 lacks a separate micro-controller and is controlled exclusively from a controller circuit located remotely relative to the UT 487. For example, as shown in FIG. 4, a separate control signal comes from the print controller 129. Alternatively, the separate control signal can come from a circuit at another location. In some embodiments, in lieu of a micro-controller 466, the separate control signal may be used to directly control the crystal and transmitter, for example, to control the timing and transmission of the ultrasonic waves. In the embodiment shown, activation of the UTCs is caused by remote circuitry (e.g., circuits at another location of the printer or networked with the printer, etc.), while micro-controller 466 controls the crystal and transmitter, although as noted above, in some embodiments this need not be the case.

While the parameters of ultrasonic transducers 487 may vary widely depending on their constitution and function, as an example, they may receive an average input voltage of 5-30 Vrms and produce output sound at a range of 0.2 to 6 meters. For example, one exemplary ultrasonic transducer can output a nominal frequency of 40 kHz sound upon application of a maximum input voltage of 20 Vrms.

Other types of UTC technology may be implemented. In an embodiment, a capacitive ultrasonic transducer (CUT) may be used. CUTs ordinarily include two conducting layers separated by a back plate. Ultrasonic waves are generated by an application of an AC voltage across the layers. CUTs can have high frequency ranges and can operate up to 2 MHz or higher. Still other transducer types for converting electrical energy into mechanical motions that create high frequency sound are available.

Figure 5:
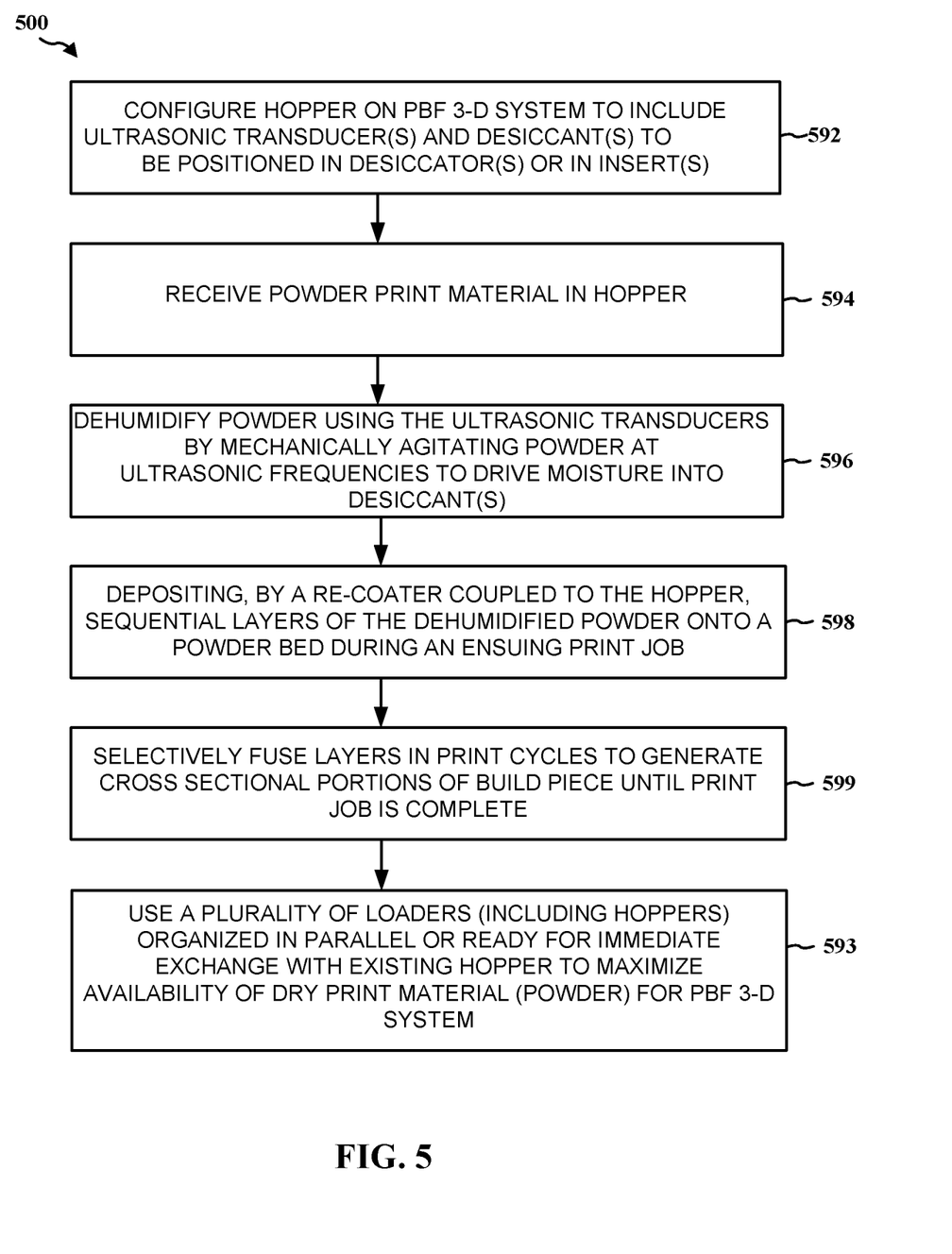
FIG. 5 is an exemplary flow diagram that illustrates a process for dehumidifying powder for use as print material in PBF 3-D system, with reference to an embodiment.

FIG. 5 is an exemplary flow diagram that illustrates a process for dehumidifying powder for use as print material in PBF 3-D system, with reference to an embodiment. A hopper can be configured on a PBF 3-D system to include one or more distributed UTs and desiccant materials in desiccators, bags, or inserts (500). The dehumidification cycle may commence when a powder-based print material is received in a hopper, such as manually or automatedly by a powder loading drum (594). A controller may activate the UTs, which in turn may dehumidify the powder at the hopper by mechanically agitating the powder using ultrasonic frequencies to drive moisture trapped by the particles into desiccants positioned in the hopper (596).

Thereupon, a print job can begin. The PBF 3-D system can deposit, using a re-coater coupled to the hopper, sequential layers of the dehumidified powder onto a powder bed (598). Between deposition cycles, one or more energy beam sources use respective deflectors to selectively fuse the deposited layer in the prior print cycle such that a solidified cross-sectional portion of the build piece 109 is generated, which continues until the build job is complete (599). In various embodiments, a plurality of loaders and associated hoppers can be organized in series or parallel and made ready to be immediately exchanged with the existing, operational hopper to maximize availability of dry print material (powder) of a variety of types for the PBF 3-D system (593).

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A powder bed fusion (PBF) system, comprising:
   a powder bed receptacle;
   a hopper to store powder;
   a desiccant positioned within the hopper and configured to confine a desiccant material, wherein the desiccant comprises a desiccator protruding through a casing of the hopper and configured to suspend the desiccant material in the stored powder;
   an ultrasonic transducer, positioned within the hopper, wherein the ultrasonic transducer is oriented to direct moisture in the powder toward the desiccant; and
   a re-coater to deposit layers of the powder onto the powder bed.

2. The PBF system of claim 1, wherein the ultrasonic transducer includes a controller for controlling the ultrasonic transducer.

3. The PBF system of claim 1, wherein the ultrasonic transducer is configured to agitate particles of the powder using one or more ultrasonic frequencies without a separate thermal source.

4. The PBF system of claim 1, wherein the ultrasonic transducer is arranged at a surface region in the casing of the hopper opposite the desiccant.

5. The PBF system of claim 1, wherein the ultrasonic transducer comprises a plurality of ultrasonic transducers arranged across at least one surface region of the hopper.

6. The PBF system of claim 1, further comprising an energy beam source positioned above the powder bed to selectively fuse the layers of the powder deposited by the re-coater.

7. The PBF system of claim 1, wherein the desiccant comprises a container or a desiccant bag.

8. The PBF system of claim 1, wherein the casing of the hopper comprises a receptacle for fitting the ultrasonic transducer to access the stored powder.

9. The PBF system of claim 1, wherein the hopper comprises an insert for positioning the desiccant.

10. The PBF system of claim 1, wherein the ultrasonic transducer and the desiccant are oriented in the hopper relative to one another such that an ultrasonic agitation of the ultrasonic transducer is toward the desiccant.

11. A powder bed fusion (PBF) system, comprising:
    a powder bed receptacle;
    a hopper having a casing, a casing receptacle, and an aperture, the hopper being configured to receive print material and to selectively deliver the print material via the aperture;
    a desiccant positioned within the hopper and configured to confine a desiccant material, wherein the desiccant comprising a desiccator protruding through the casing of the hopper and configured to suspend the desiccant material in the print material;
    an ultrasonic transducer, positioned within the casing receptacle, wherein the ultrasonic transducer is oriented to direct moisture in the print material toward the desiccant; and
    a re-coater, coupled to the aperture of the hopper, wherein the re-coater deposits the print material onto the powder bed.

12. The PBF system of claim 11, wherein the ultrasonic transducer and the desiccant are oriented in the hopper relative to one another such that an ultrasonic agitation of the ultrasonic transducer is toward the desiccant.

13. The PBF system of claim 11, wherein the desiccant comprises a container or a desiccant bag.

* * * * *